United States Patent
Rinsma et al.

(10) Patent No.: US 6,462,497 B1
(45) Date of Patent: Oct. 8, 2002

(54) METHOD AND APPARATUS FOR ENERGIZING ROTATION-TRANSLATION CONVERTERS

(75) Inventors: Andries Christian Rinsma, Nieuw Amsterdam (NL); Johannes Albertus Van Winden, Heidelberg (DE)

(73) Assignee: SKF Engineering & Research Centre B.V., Nieuwegein (NL)

(*) Notice: Subject to any disclaimer, the term of this patent is extended or adjusted under 35 U.S.C. 154(b) by 0 days.

(21) Appl. No.: 09/787,010

(22) PCT Filed: Sep. 10, 1999

(86) PCT No.: PCT/NL99/00564
§ 371 (c)(1),
(2), (4) Date: Jun. 29, 2001

(87) PCT Pub. No.: WO00/16175
PCT Pub. Date: Mar. 23, 2000

(30) Foreign Application Priority Data

Sep. 11, 1998 (NL) .............................................. 1010068

(51) Int. Cl.$^7$ .............................................. G05B 23/02
(52) U.S. Cl. ................... 318/567; 381/565; 381/568.22
(58) Field of Search ................. 318/560, 565, 318/567, 568.16, 568.18, 568.22, 635, 646; 188/137; 192/70.22, 82 P, 84.6

(56) References Cited

U.S. PATENT DOCUMENTS

| 4,033,435 A | | 7/1977 | Bayliss |
| 5,444,348 A | * | 8/1995 | Garree .......................... 318/640 |
| 5,678,671 A | | 10/1997 | Leimbach et al. |
| 6,218,801 B1 | * | 4/2001 | Brogardh et al. ........... 318/567 |

FOREIGN PATENT DOCUMENTS

DE          196 01 983 C1          7/1997

* cited by examiner

Primary Examiner—Khanh Dang
(74) Attorney, Agent, or Firm—Oliff & Berridge, PLC

(57) ABSTRACT

A system for controlling an assembly of an electrical motor and a rotation-translation converter is provided. The rotation-translation converter is connected to the electrical motor. The electrical motor is energized with a predetermined current for obtaining a torque to overcome an internal friction of the rotation-translation converter. The current is increased until the electrical motor provides a total torque. The total torque is converted by the rotation-translation converter into a predetermined force on an object or into a displacement of the object. The object is moveable by the rotation-translation converter. The system may also reduce the current through the electrical motor after reaching the predetermined force to a predetermined current value. Under this predetermined current value, the predetermined force on the object remains substantially equal.

7 Claims, 1 Drawing Sheet

US 6,462,497 B1

METHOD AND APPARATUS FOR ENERGIZING ROTATION-TRANSLATION CONVERTERS

BACKGROUND OF THE INVENTION

1. Field of Invention

The present invention relates to a method and apparatus for controlling an assembly of an electrical motor and a rotation-translation converter connected thereto.

2. Description of Related Art

U.S. Pat. No. 5,678,671 discloses a motor vehicle clutch assembly having an actuator device, the actuator device having a clutch motion blocking system. The clutch motion blocking system may be a current supply system, supplying a blocking current to the actuator device to block the linear movement of the actuator in a preferred position. The blocking current is specified as being less than 10 Amperes, and preferably less than 6 Amperes.

German patent DE-C-196 01 983 discloses a brake system for vehicles with an integrated electrical parking brake. The electrical parking brake is actuated with a current supply when driving the vehicle such that the electrical parking brake exerts no force. By cutting the current to the electrical parking brake, the friction of the brake system is enhanced resulting in a self-arresting brake action of the brake system.

U.S. Pat. No. 4,033,435 discloses a retainer mechanism for vehicle brake actuators. An electrical motor is operable when energised to hold a resilient brake applying assembly in a retracted energy-storing position and to retain the assembly in the retracted position. In this system, the current to the electrical motor has to be increased to decrease the brake action.

Conventionally, in controlling assemblies of an electrical motor and a rotation-translation converter, as known by the person skilled in the art, the electrical motor is controlled for providing a torque, such that the rotation-translation converter exerts a predetermined force on an object attached to the rotation-translation converter, which cannot move further in the direction of the exerted force.

An Electro Mechanical Brake Actuator (EMBA) is described in Dutch patent application 1009626, in the name of the applicant, which is hereby incorporated by reference. In these brake actuators, a predetermined force has to be exerted on a brake piston during a certain time period (on the order of 1 sec . . . 20 sec). This is achieved by controlling the current through the electrical motor of the brake actuator. The electrical motor provides a torque, which in first instance is converted by a rotation-translation converter into a movement of the brake piston attached to the output side of the rotation-translation converter until it touches the brake lining or brake disc. As the brake piston is unable to move further, the torque of the electrical motor is converted into a force on the brake piston, resulting in a brake action. Preferably, this control is utilised for static forces which need to be maintained during a certain time period (1 sec . . . 20 sec) and is only applied after, e.g., 0.5 sec.

However, the rotation-translation converter has an internal friction which needs to be overcome by the torque provided by the electrical motor. This requires an initial current. Only when, after this, the current through the electrical motor is further increased, a translational movement at the output side of the rotation-translation converter will result, or, when the brake piston touches the brake lining or brake disc and can not move further, a force will be exerted on the brake piston. It is also possible that the moveable object is a spring (in case of the EMBA a brake calliper) with a certain rigidity, whereby the force on the spring will be accompanied by a predetermined displacement. The brake force of the EMBA will now increase approximately linearly with the current fed to the electrical motor.

When it is required to decrease the predetermined force (ending or reducing the brake action), the current first has to decrease to a predetermined current value, whereby the friction of the rotation-translation converter has to be overcome in the opposite direction. During this reduction, the force exerted on the brake piston remains substantially the same. When the friction force of the rotation-translation converter has been overcome in the opposite direction, the force on the brake piston at the output side of the rotation-translation converter decreases with the decreasing current through the electrical motor. When no resulting force is exerted on the brake piston, it will move away from the brake lining or brake disc, ending the brake action.

The internal friction of the rotation-translation converter therefore results in a hysteresis in the relationship of the current through the electrical motor and the force exerted on the brake piston by the rotation translation converter.

When controlling the EMBA, it happens that the brake force has to be maintained during a predetermined time period (on the order of 1 sec . . . 20 sec). A disadvantage of the known method for the operation of e.g. the EMBA, is that actually too much current is used in maintaining a predetermined brake force. This leads to firstly, a larger use of energy and secondly, development of extra heat in the EMBA.

SUMMARY OF THE INVENTION

In one aspect, the present invention relates to a method for controlling an assembly of an electrical motor and a rotation-translation converter which uses (electrical) energy more efficiently than the known systems. The method has the advantage that during the maintaining of the predetermined force at the output side of the rotation-translation converter, less current is required to flow through the electrical motor, resulting in less energy consumption of the assembly. This saving of energy is accompanied by a reduced heat development. These mentioned advantages will also make the operation of the assembly more reliable and the lifetime of the assembly will increase.

From the specifications of the rotation-translation converter, e.g., the pitch and diameter of a threaded converter, the manner in which the conversion of the torque of the electrical motor in a force on the object takes place, can be deduced quantitatively. As the current-torque characteristics of the electrical motor are also known, it is simple to determine the relationship of the current through the electrical motor and the force on the object in the ideal case (i.e., without friction). When it is required to maintain a predetermined force on the object, it is therefore also known what current should flow through the electrical motor. The current can be decreased until that current value, without reduction of the force on the object.

When measurement means are provided for detecting at which current the internal friction of the rotation-translation converter is overcome, the value of the first current can be determined as the difference of the current at which the predetermined force is reached and the current at which the internal friction is overcome.

Because the rotation-translation converter has an internal friction, the current can actually be reduced even further as in the embodiment described above. The torque of the electrical motor will have to be reduced until the converted torque plus the friction force of the rotation-translation converter is equal to the force exerted on the object. Only a further reduction of the torque of the electrical motor will result in a decrease of the force on the object.

In a preferred embodiment of the present invention, in the step of reducing said current, said current is further reduced to a transition current value at which the torque delivered by the electrical motor and converted by the rotation-translation converter into a force plus the internal friction of the rotation-translation converter is equal to the predetermined force on the object.

As the force-current relationship is symmetric, the transition current value can also be determined when, as described above, the current is known in the ideal case without internal friction of the rotation-translation converter. The transition current value is then equal to twice the current in the ideal case minus the current at which the predetermined force is reached.

In order to optimally use the energy to energise the electrical motor, attempts will have to be made to attain as close as possible the current value at which the torque delivered by the electrical motor and converted into a force by the rotation-translation converter plus the internal friction of the rotation-translation converter is equal to the predetermined force on the object. This current value constitutes the transition point, at which a further reduction of the current through the electrical motor will result in a reduction of the force on the object.

In a further embodiment of the method according to the present invention, the method, therefore, comprises the further step of determining a minimum current value by decreasing the current through the electrical motor stepwise until a decrease of the force on the object or a backward movement of the rotation-translation converter is detected.

The minimum current value can be detected by observing the force on the object, or by observing a backward motion (at the rotation or translation side) of the rotation-translation converter.

A further embodiment of the method according to the present invention comprises the further step of again increasing the current through the electrical motor.

By adjusting the current to a value slightly higher than the transition current value, further reduction of the force by external influences is prevented. When the friction force of the rotation-translation converter decreases or the force on the object increases as a result of e.g. oscillations of the brake disc or variation in thickness, the transition point will not be passed when the current is kept equal.

A still further embodiment of the present method comprises the further step of again increasing the current through the electrical motor until the predetermined force has been reached again and successively decreasing the current to a level which is at least one current step higher than the previous determined minimum current value.

In this embodiment, therefore, the method returns to a level of the force on the object and the current just before the reversal point, making the method even less sensitive to external influences.

In another aspect, the present invention relates to an apparatus comprising an assembly of an electrical motor and a rotation-translation converter connected to said electrical motor, an object moveable by said rotation-translation converter, control means for driving said electrical motor with a current (I) and first detection means connected to said control means for detection of a force (F) exerted by said rotatio-translation converter on said object, said control means (6) being equipped to control said current (I) through said electrical motor by energising said electrical motor with a current (I) having a first value ($I_1$) for obtaining a torque overcoming the internal friction of said rotation-translation converter, increasing said current (I) until said electrical motor provides a total torque, which is converted by said rotation-translation converter into a predetermined force ($F_1$) on an object moveable by said rotation-translation converter, reducing said current (I) through said electrical motor after reaching said predetermined force ($F_1$), during which said predetermined force ($F_1$) on said object is maintained substantially equal.

The first detection means, e.g., measure the force which the rotation-translation converter exerts on the object, by means of which the control means adjust the current through the electrical motor. However, the first detection means can also detect the force on different locations and in different ways.

In a further embodiment, the apparatus further comprises second detection means connected to said control means for detection of rotation of said rotation-translation converter. This embodiment has specific advantages. When an equally maintained force is exerted on the object by the rotation-translation converter, the rotation-translation converter will of course not rotate. The second detection means can detect whether the torque, converted into a force by the rotation-translation converter, plus the friction force of the rotation-translation converter becomes smaller than the predetermined force, as in that case the rotation-translation converter will rotate in the opposite direction.

BRIEF DESCRIPTION OF THE DRAWINGS

The present invention will now be described in more detail with reference to a preferred embodiment with reference to the accompanying drawings, in which.

DETAILED DESCRIPTION OF PREFERRED EMBODIMENTS

Figure 1:
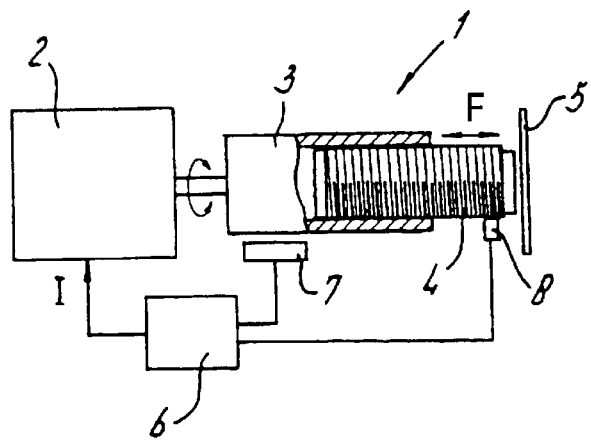
FIG. 1 shows a partially exploded view of an apparatus according to the present invention.

The present invention relates to a method for controlling an assembly 1 of an electrical motor 2 and a rotation-translation converter 3 connected to it, as shown in the partially exploded view of FIG. 1. The rotation-translation converter 3 converts the rotational movement of the electrical motor 2 into a translational movement of an object 4 attached to the converter 3. The object 4 may, e.g., be a brake piston which can be pressed against a brake lining or brake disc 5. When the brake piston 4 can not move further because of blocking by the brake lining 5, the torque provided by the electrical motor 2 will be converted into a force F on the brake piston 4 by the rotation-translation converter. In this manner, the brake force of the assembly 1 can be controlled. The apparatus is provided with control means 6 which control the current I through the electrical motor 2. This happens, amongst others, in dependence of the force F which the rotation-translation converter 3 exerts on the object 4 and is measured by the first detection means 7. The first detection means 7 can also measure the force F on different positions and in different ways.

An example of such an assembly is the electromechanical brake actuator of SKF (EMBA). The EMBA is described in Dutch patent application 1009626 of the applicant, which is included herein by reference.

In a preferred embodiment, the apparatus is further provided with second detection means 8 for detecting a rotation of the rotation-translation converter 3, in which the second measurement means are also connected with the control means 6. The function of the second detection means 8 will be described hereafter in the description of a preferred embodiment of the method according to the invention.

Figure 2:
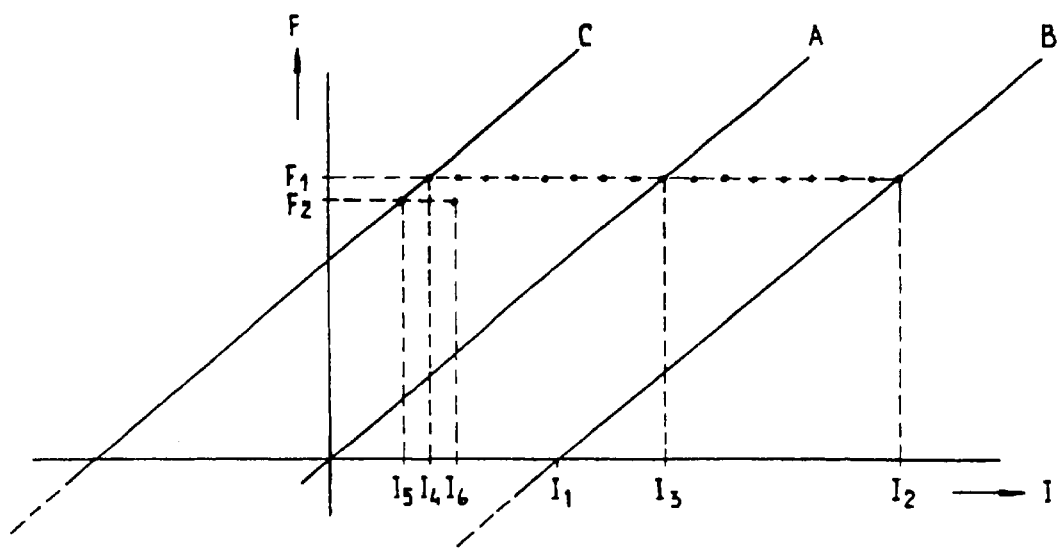
FIG. 2 shows a diagram of the relationship of the force on the object and the current through the electrical motor.

FIG. 2 shows a diagram of the relationship of the force F on the brake piston 4 and the current I through the electrical motor 2. The line A indicates the relationship in the ideal case, in which the current I through the electrical motor 2 is converted into a torque, and in which the torque is converted into a force F on the brake piston 4 without friction.

The rotation-translation converter 3, however, exhibits an internal friction when converting the rotation into a translation, which has to be overcome by the electrical motor 2 first. For this, a current II has to be fed to the electrical motor 2. Only when the current I is further increased, a force F will be exerted on the brake piston 4. The force F will increase substantially linear with the supplied current I, for example along the line B in FIG. 2.

During operation of, e.g., the EMBA, a predetermined brake force has to be maintained during a predetermined time period (on the order of 1 sec . . . 20 sec). The control method according to the present invention is preferably applied with static forces which need to be maintained during that period (1 sec . . . 20 sec) and operates, e.g., only after 0.5 sec. The brake force is indicated in FIG. 2, e.g., by $F_1$ and is reached at a current $I_2$ through the electrical motor 2.

When the brake force has to be reduced, the current I should also be reduced. However, the brake force F will remain equal to $F_1$, as the internal friction force of the rotation-translation converter 3 plus the converted torque of the electrical motor 2 remains equal to the brake force $F_1$. The internal friction force, which had to be overcome in a first instance when increasing the current I, now operates against the reduction of the brake force F.

When the friction force has been overcome once again (at transition current value $I_4$), the force F on the brake piston 4 will again decrease linearly along line C in FIG. 2. To completely alleviate the brake force, even a negative current $-I_1$ will have to flow through the electrical motor 2. The lines A, B and C in FIG. 2 are substantially parallel.

The internal friction force of the rotation-translation converter 3 results in a hysteresis effect in the force-current relationship. This means that, when during a certain time period a predetermined force F has to be exerted on the brake piston 4, actually too high a current will flow through the electrical motor. This is not very energy efficient and will secondly lead to additional, unwanted heating of the assembly 1.

The method according to the present invention utilises this hysteresis by reducing the current I after reaching a predetermined desired force $F_1$ on the brake piston 4, during which the desired brake force $F_1$ will remain equal. This will result in a lower use of energy and less heat development in the assembly. These mentioned advantages will also make the operation of the assembly more reliable and the lifetime will increase.

Preferably, the current I is reduced until the torque provided by the electrical motor 2 is equal to the torque which would be necessary to provide the predetermined force F when the rotation-translation converter 3 would be frictionless, i.e., until the line A in FIG. 2 is reached. The line A can be determined from the current-torque characteristic of the electrical motor 2 used and the conversion characteristics of the rotation-translation converter 3. After reaching the desired force $F_1$ on the brake piston 4 at current $I_2$, the current I can therefore be reduced to $I_3$. This requires no further measurement and/or detection means.

When measurement means are provided for detecting at which current $I_1$ the internal friction of the rotation-translation converter 3 is overcome, the value of the first current $I_3$ can be determined from the difference of the current $I_2$ at which the predetermined force is reached and the current $I_1$ at which the internal friction is overcome.

According to a further embodiment of the present method, the current I is further reduced until the transition current value $I_4$ at which the torque, provided by the electrical motor 2 and converted by the rotation-translation converter 3 into a force, plus the internal friction of the rotation-translation converter 3 is equal to the predetermined force $F_1$ on the brake piston 4. By further reducing the current I through the electrical motor 2, the force F on the brake piston 4 will decrease further along the line C.

As the force-current relationship is symmetrical, the transition current value $I_4$ can also be determined when, as previously mentioned, the current $I_3$ is known in the ideal case without internal friction of the rotation-translation converter 3. The transition current value $I_4$ is then equal to twice the current $I_3$ in the ideal case minus the current $I_2$ at which the predetermined force is reached ($I_4=I_3-(I_2-I_3)=2*I_3-I_2$).

Preferably, the reaching of a minimum value $I_5$ is determined by reducing the current I through the electrical motor 2 stepwise, until a reduction of the force F on the brake piston 4 is detected, or until a backward motion of the rotation-translation converter 3 is detected.

This stepwise reduction of the current I is indicated in FIG. 2 by the points in the diagram of the current-force relationship. At current $I_2$ the desired force $F_1$ is reached, after which the current is reduced stepwise. At current 15, the torque of the electrical motor 2, converted by the converter 3 into a force $F_1$ plus the internal friction of the rotation-translation converter 3 will become somewhat less than the desired force $F_1$, and be equal to $F_2$. This adjustment point can then be maintained during the predetermined period.

When a constant force $F_1$ is exerted on the object 4 by the rotation-translation converter 3, the rotation-translation converter 3 will not rotate. The second detection means 8 of the apparatus according to the present invention can detect whether the torque, converted by the rotation-translation converter 3 into a force, plus the friction force of the rotation-translation converter becomes smaller than the predetermined force $F_1$, as in that case the rotation-translation converter 3 will start to rotate in an opposite direction.

However, preferably the current I is again increased, e.g., until current $I_6$. In this case, the rotation-translation converter 3 will remain exerting the same force $F_2$ on the brake piston 4, but the assembly 1 will be less sensitive for external influences. When the friction force of the rotation-translation converter 3 decreases, or the force F on the moveable object 4 increases by e.g. oscillations of the brake disc 5 or a variation in thickness, the transition point will not be passed when current $I_6$ is maintained.

It can, however, be advantageous to again increase the current I to current value $I_2$ and subsequently reducing it to current value $I_6$. This will bring the force back to the original level $F_1$ while the current I remains in front of the transition point in the hysteresis loop of the force-current relationship.

Although the method according to the present invention is explained by means of an assembly 1 used in an electromechanical brake actuator, this method can be used advantageously in controlling every assembly using an electrical motor 2 and a rotation-translation converter 3 exhibiting internal friction.

What is claimed is:

1. A method for controlling an assembly that includes an electrical motor and a rotation-translation converter connected to said electrical motor, the method comprising the steps of:

energising said electrical motor with a current having a first value for obtaining a torque overcoming the internal friction of said rotation-translation converter;

increasing said current until said electrical motor provides a total torque, which is converted by said rotation-translation converter into a predetermined force on an object moveable by said rotation-translation converter; and reducing said current through said electrical motor after reaching said predetermined force, during which said predetermined force on said object is maintained substantially equal, wherein said current is reduced to at least a first current value, at which current value the torque delivered by said electrical motor is equal to the torque needed to provide said predetermined force when said rotation-translation converter would be frictionless, the first current value being calculated based on the specifications of said electrical motor and said rotation-translation converter.

2. The method according to claim 1, further comprising reducing said current to a transition current value, at which current the torque delivered by said electrical motor and converted by said rotation-translation converter into a force plus the internal friction of said rotation-translation converter is equal to said predetermined force.

3. The method according to claim 2, further comprising:

determining a minimum current value by decreasing said current through said electrical motor stepwise until a decrease of said force on said object or a backward movement of said rotation-translation converter is detected.

4. The method according to claim 3, further comprising:

again increasing said current through said electrical motor.

5. The method according to claim 3, wither comprising:

again increasing said current through said electrical motor until said predetermined force has been reached again and successively decreasing said current to a value which is at least one current step higher than said previous determined minimum current value.

6. An apparatus for moving an object, comprising:

an assembly that includes an electrical motor and a rotation-translation converter connected to sa id electrical motor;

the object moveable by said rotation-translation converter;

control means for driving said electrical motor with a current; and first detection means connected to said control means for detection of a force exerted by said rotation-translation converter on said object;

wherein said control means 1) is equipped to control said current through said electrical motor by energising said electrical motor with a current having a first value for obtaining a torque overcoming the internal friction of said rotation-translation converter; 2) increases said current until said electrical motor provides a total torque, the total torque being converted by said rotation-translation converter into a predetermined force on the object moveable by said rotation-translation converter; and 3) reduces said current through said electrical motor after reaching said predetermined force, said predetermined force on said object being maintained substantially equal while the current is being reduced;

wherein the control means is further arranged to reduce said current to a first current value, at which current value the torque delivered by said electrical motor is equal to the torque needed to provide said predetermined force when said rotation-translation converter is frictionless, the first current value being calculated based on the specifications of said electrical motor and said rotation-translation converter.

7. The apparatus according to claim 6, further comprising:

second detection means connected to said control means for detection of rotation of the rotation-translation converter.

* * * * *